United States Patent
Ebara

[11] Patent Number: 6,089,738
[45] Date of Patent: Jul. 18, 2000

[54] LAMP UNIT WITH AN EXTERNAL POWER SUPPLY TERMINAL

[75] Inventor: Katsumi Ebara, Wako, Japan

[73] Assignee: Honda Giken Kogyo Kabushiki Kaisha, Tokyo, Japan

[21] Appl. No.: 09/152,248

[22] Filed: Sep. 11, 1998

[30] Foreign Application Priority Data

Sep. 12, 1997 [JP] Japan .................................. 9-249051

[51] Int. Cl.⁷ .............................................. F21W 101/02
[52] U.S. Cl. .......................... 362/546; 362/473; 362/253; 362/362; 362/95
[58] Field of Search .................................. 362/473, 474, 362/475, 546, 253, 458, 362, 95

[56] References Cited

U.S. PATENT DOCUMENTS

| | | | |
|---|---|---|---|
| 1,245,068 | 10/1917 | Thomas | 362/95 X |
| 3,061,716 | 10/1962 | Benander | 362/95 X |
| 3,137,448 | 6/1964 | Holzhause | 362/253 |
| 4,546,418 | 10/1985 | Baggio et al. | 362/95 X |
| 4,546,419 | 10/1985 | Johnson | 362/95 |
| 5,184,279 | 2/1993 | Horn | 362/362 X |
| 5,820,254 | 10/1998 | Duenas | 362/473 |
| 5,964,516 | 10/1999 | Lai | 362/95 |

FOREIGN PATENT DOCUMENTS

Y2-63-49397  12/1988  Japan .

*Primary Examiner*—Laura K. Tso
*Attorney, Agent, or Firm*—Birch, Stewart, Kolasch & Birch, LLP

[57] ABSTRACT

A lamp unit includes a cover having an opening therein for an external power supply terminal for supplying electric power to the outside. An external power supply terminal body is inserted from a front face of the opening and fixedly fastened to the cover by a nut which is threadably engaged with a screw thread portion of the external power supply terminal body on a rear face of the opening. A removable cap is fitted with an end of the external power supply terminal. The lamp unit prevents water, mud or the like from directly attacking the external power supply terminal. Further, the appearance around the lamp unit is pleasing.

17 Claims, 7 Drawing Sheets

LAMP UNIT WITH AN EXTERNAL POWER SUPPLY TERMINAL

BACKGROUND OF THE INVENTION

1. Field of the Invention

The present invention relates to a lamp unit with an external power supply terminal suitable for use with a three-wheel motor vehicle or a four-wheel motor vehicle, such as an all-terrain vehicle.

2. Description of the Background Art

A lamp unit is disclosed in the official gazette of Japanese Utility Model Publication Application No. Showa 63-49397 which is suitable for use with a three-wheel motor vehicle or a four-wheel motor vehicle. This lamp unit has a cover and a lamp body partly covered with the cover. The lamp unit is mounted on a handle holder having a handle bar thereon by means of a headlamp holder.

In the four-wheel motor vehicle disclosed in this official gazette, an external power supply terminal for supplying electric power generated by engine power is mounted on a horizontal side portion of the headlamp holder described above. However, water, mud or the like is able to enter directly into the external power supply terminal due to the arrangement of the external power supply terminal as described above. Also, no consideration is given to the appearance of the lamp unit, and this degrades the appearance around the lamp which has a significant influence on the design of the vehicle.

SUMMARY OF THE INVENTION

It is therefore an object of the present invention to provide a lamp unit with an external power supply terminal which prevents water, mud or the like from directly entering into the external power supply terminal.

It is a further object of the present invention to provide a lamp unit with an external power supply terminal which has a pleasing appearance.

In order to attain the objects described above, a lamp unit which includes a cover and a lamp body provided in such a manner as to be partly covered with the cover is provided forwardly of a handle member. The lamp unit includes an external power supply terminal for supplying electric power to the outside, and has an opening provided in the cover for the external power supply terminal. An external power supply terminal body is inserted from a front face of the opening and is fixedly fastened to the cover by a nut which is threadably engaged with a screw thread portion of the external power supply terminal body on a rear face of the opening. A removable cap is fitted with an end of the external power supply terminal.

Water, mud or the like does not directly enter the external power supply terminal because the external power supply terminal body is inserted in the cover which covers the lamp body and is fastened on the rear face by the nut, and because the removable cap is provided. The fastening member for fastening the terminal is not exposed to the front face of the cover and the appearance is very good.

The external power supply terminal is directed obliquely downwardly, so that even if water, mud or the like should enter the external power supply terminal across the cap, it is likely to flow down and is not likely to stay in the external power supply terminal.

The cap includes a plurality of annular seal portions which contact with an outer peripheral face of an opening end of the external power supply terminal to further unsure that water, mud or the like does not enter the external power supply terminal through a gap between the cap and an opening end of the external power supply terminal. Further, since such sealing is provided on the outer peripheral face, even if water or the like enters, the influence on an inner peripheral face of the terminal is little.

The cap further includes a projection for insertion into an inner peripheral face side of an opening end of the external power supply terminal. Since the projection to be inserted into the inner circumferential face side of the opening end of the external power supply terminal is provided on the cap in this manner, as the projection is inserted into the inner circumferential face side of the opening end of the external power supply terminal upon mounting of the cap onto the opening end of the external power supply terminal, the position of the cap is guided in a diametrical direction with respect to the opening end of the external power supply terminal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

An assist lamp as a lamp unit with an external power supply terminal according to an embodiment of the present invention is described below with reference to the drawings.

Figure 1:
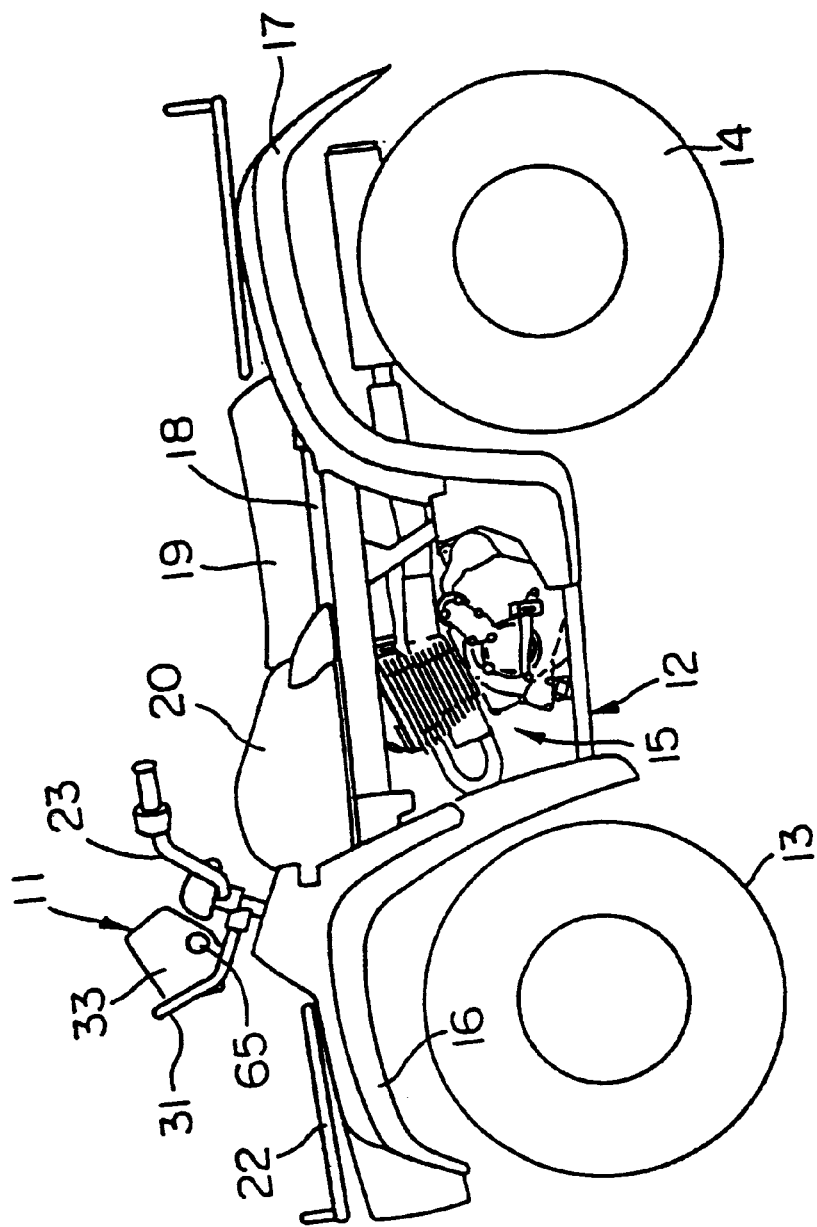
FIG. 1 is a side elevational view showing a saddle-seat four-wheel motor vehicle which includes an assist lamp as a lamp unit with an external power supply terminal according to an embodiment of the present invention.
Figure 2:
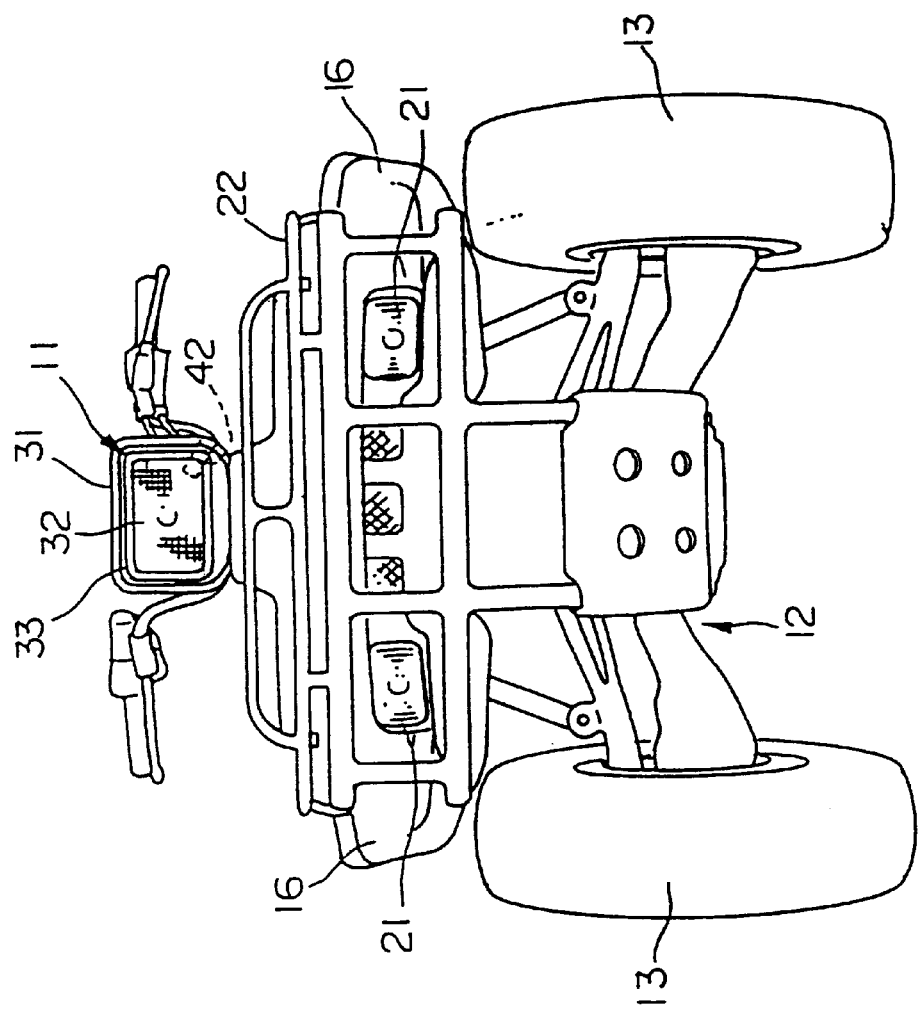
FIG. 2 is a front elevational view showing the saddle-seat four-wheel motor vehicle which includes the lamp unit with an external power supply terminal according to the embodiment of the present invention.

FIGS. 1 and 2 show a saddle-seat four-wheel motor vehicle on which an assist lamp 11 is mounted for riding on uneven ground. Front wheels 13 are provided on the left and right of a front portion of a vehicle body 12, while rear wheels 14 are provided on the left and right of a rear portion of the vehicle body 12. An engine 15 is provided at a central portion of the vehicle body 12. The front wheels 13 and the rear wheels 14 are covered on the upper sides thereof with fenders 16, 17, respectively. A vehicle body cover portion 18 is provided at a position among the fenders 16, 17 in such a manner as to cover an upper portion of the engine 15. A seat 19 is mounted at a middle portion of the vehicle body cover portion 18. A tank cover 20 for covering a fuel tank is provided forwardly of the seat 19. Headlamps 21 are located at two left and light locations at a front end portion of the vehicle body cover portion 18. A carrier 22 for receiving a load is provided on the upper side of a front portion of the vehicle body cover portion 18.

Figure 3:
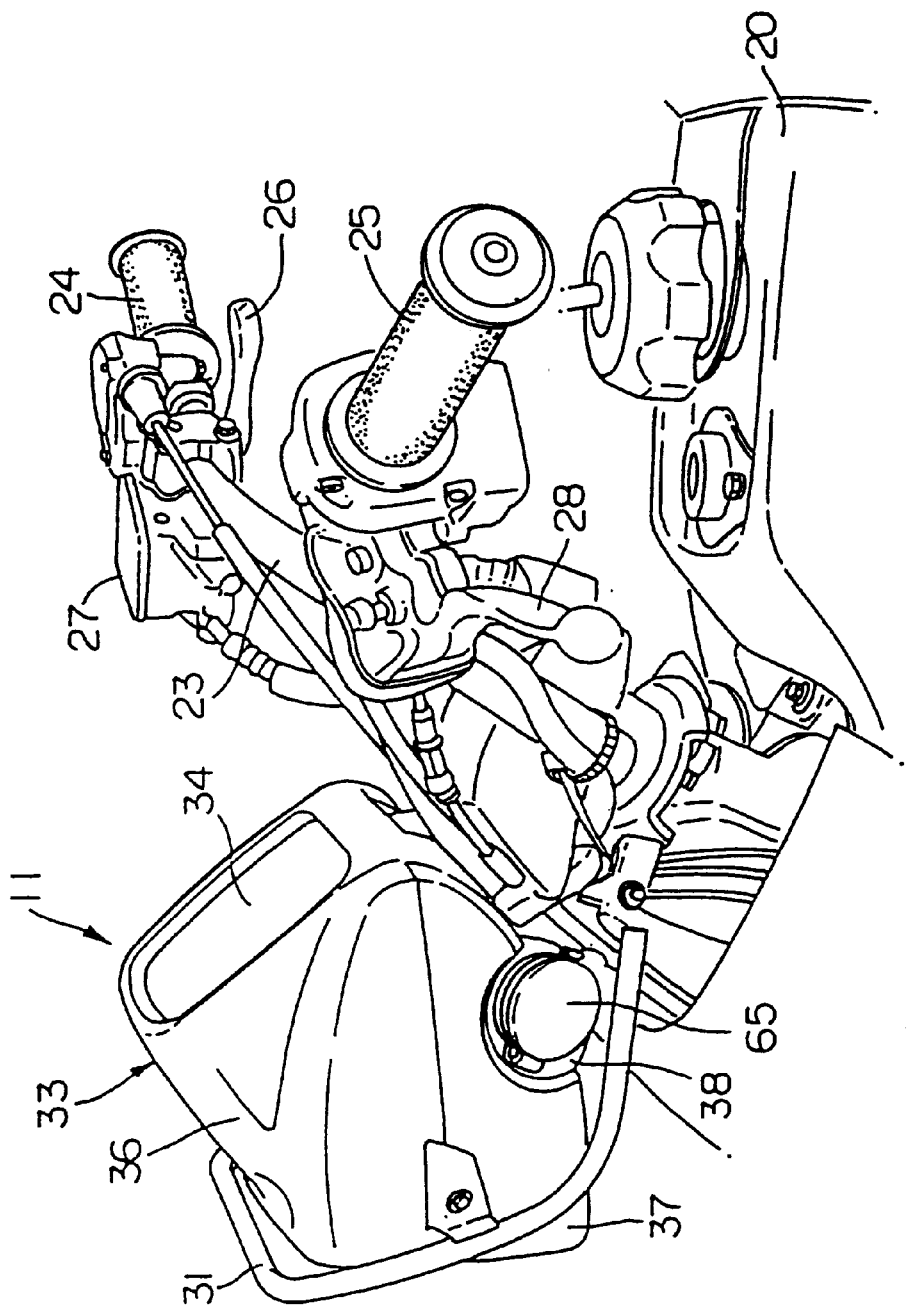
FIG. 3 is a perspective view showing a portion of the saddle-seat four-wheel motor vehicle which includes the lamp unit with an external power supply terminal according to the embodiment of the present invention.

As shown in FIG. 3, a handle bar 23 for steering the front wheels 13 is mounted forwardly of the tank cover 20 such that it extends leftwardly and rightwardly. Opposite end portions of the handle bar 23 are formed as grips 24, 25 to be gripped by a driver. An accelerator lever 26, a brake master cylinder 27 and so forth are arranged in the proximity of the right side grip 24, while a clutch lever 28 is arranged in the proximity of the left side grip 25.

The assist lamp 11 described above is provided forwardly of the handle bar 23. This assist lamp 11 is mounted on the vehicle body 12 side by means of a lamp stay 31.

In the following, the assist lamp 11 is described. It is to be noted that a direction such as an upper or lower direction in the following description represents a direction in a mounted condition of the assist lamp 11 on the vehicle body 12.

The assist lamp 11 has a lamp body 32 (refer to FIG. 2) for irradiating light, and a cover 33 which covers a portion of the lamp body 32 except for the irradiation side. A meter 34 is provided on a rear side of an upper portion of the cover 33.

Figure 4:
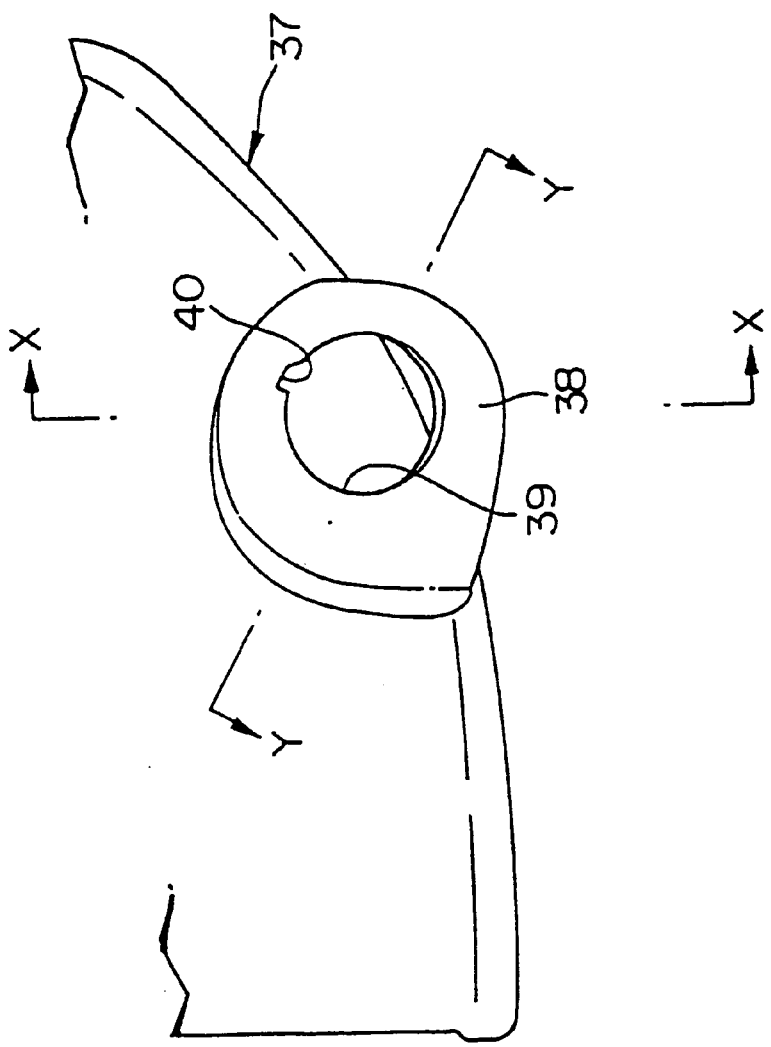
FIG. 4 is a side elevational view showing a lower cover member of the lamp unit according to the embodiment of the present invention.
Figure 5:
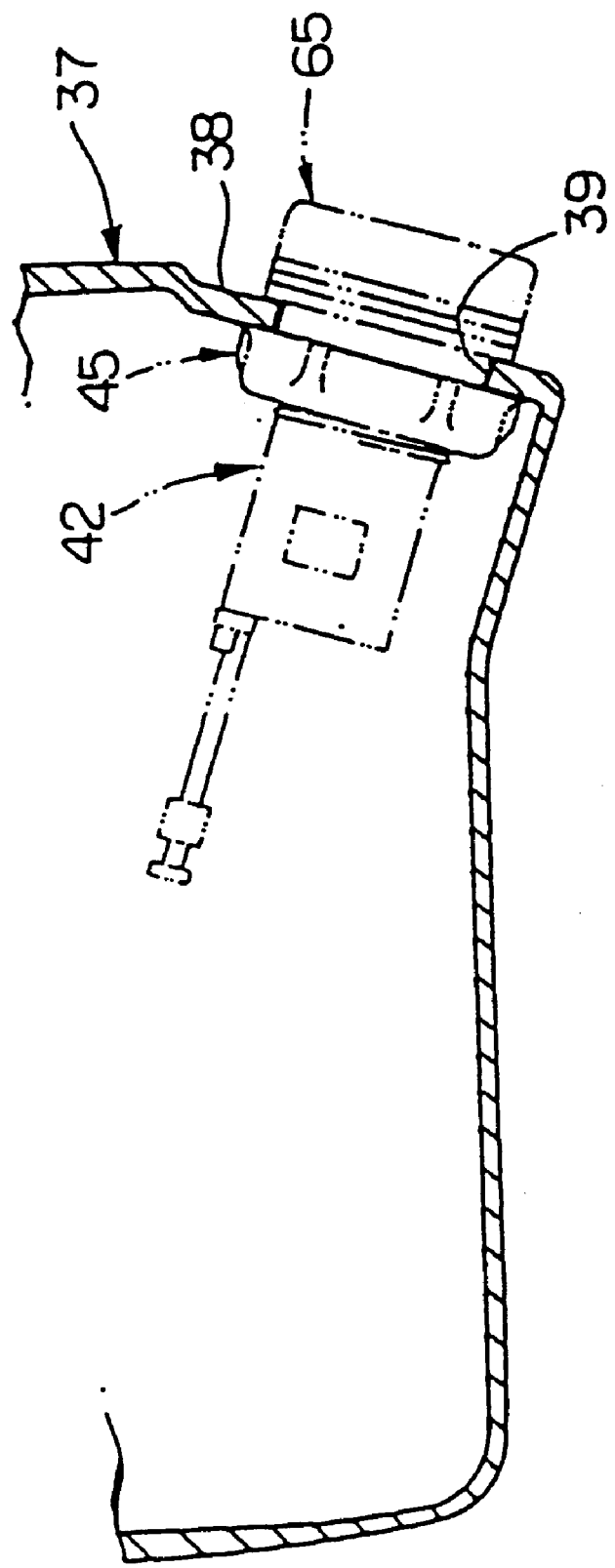
FIG. 5 is a sectional view taken along line X—X of FIG. 4 of the lamp unit according to the embodiment of the present invention.

The cover 33 is divided into an upper cover member 36 and a lower cover member 37. As shown in FIGS. 4 and 5, a mounting plate portion 38 which is inclined such that an upper side comes to an outer side is formed at a predetermined position of one side face of the lower cover member 37 in the leftward and rightward direction, particularly at a predetermined position of a rear side of the left side face. A mounting hole (opening) 39 is formed perpendicularly through this mounting plate portion 38. A grooved portion 40 is formed at a predetermined position, particularly at a rear side of an upper portion, of the mounting hole 39.

Figure 6:
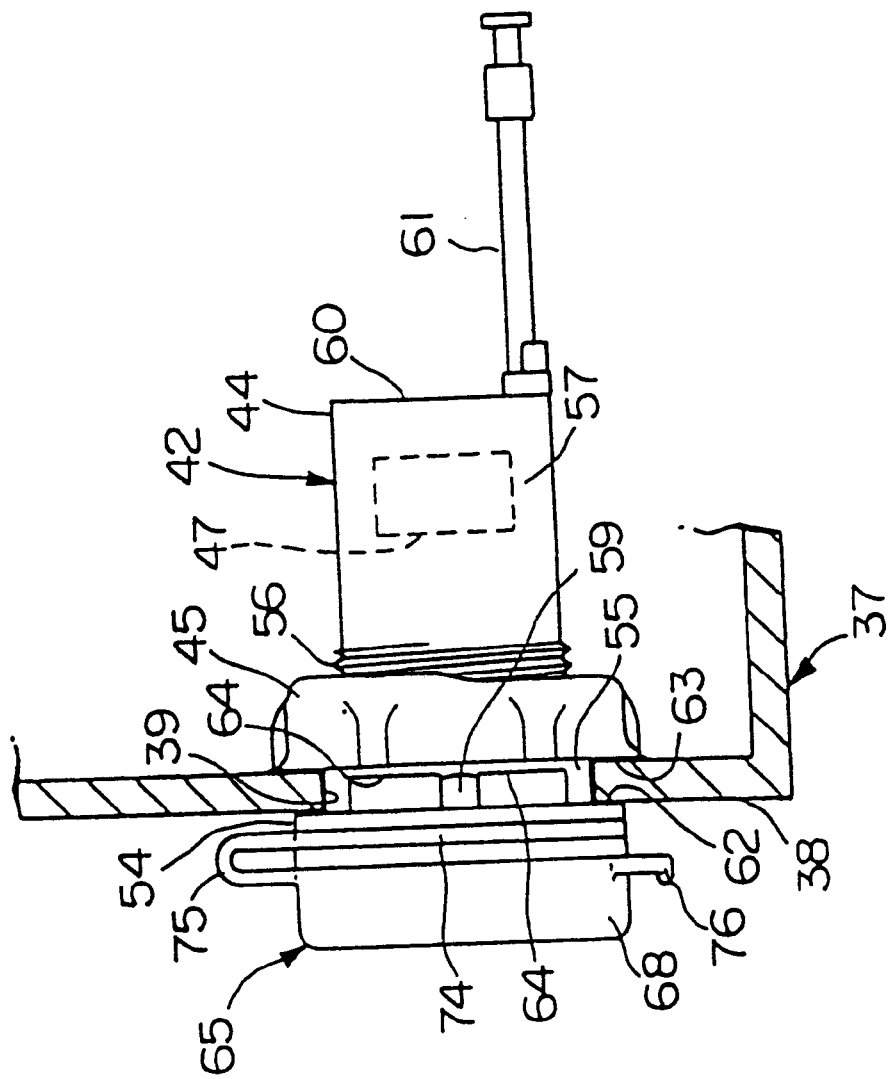
FIG. 6 is a sectional view taken along line Y—Y of FIG. 4 of the lamp unit according to the embodiment of the present invention.

As shown in FIG. 5, an accessory socket (external power supply terminal) 42 is mounted in this mounting hole 39 of the lower cover member 37 along an axial direction of the same. This accessory socket 42 is described with reference to FIGS. 5 to 7.

The accessory socket 42 has a substantially bottomed cylindrical socket body (external power supply terminal body) 44 on which a cylindrical portion 43 is partly formed, and a nut member 45 is meshed with the cylindrical portion 43 of the socket body 44. A connection portion 47 for establishing an electric connection to an external apparatus or the like to supply electric power generated by engine power is provided on the inner side of the cylindrical portion 43 and in the interior (bottom side) by a predetermined amount from an end opening 46.

On an outer diameter side of the socket body 44, a chamfered portion 51 is arranged in an adjacent relationship to an end face 50 on the opening side. A first outer diameter portion 52 of a predetermined diameter is arranged in an adjacent relationship on the opposite side to the end face 50 with respect to the chamfered portion 51, while a second outer diameter portion 53 having a diameter smaller than that of the first outer diameter portion 52 is arranged in an adjacent relationship on the opposite side to the chamfered portion 51 with respect to the first outer diameter portion 52.

A third outer diameter portion 54 having a diameter larger than those of the first outer diameter portion 52 and the mounting hole 39 is arranged in an adjacent relationship on the opposite side to the first outer diameter portion 52 with respect to the second outer diameter portion 53, A fourth outer diameter portion 55 having a diameter smaller than that of the third outer diameter portion 54 but substantially equal to that of the mounting hole 39 is arranged in an adjacent relationship on the opposite side to the second outer diameter portion 53 with respect to the third outer diameter portion 54.

A threaded portion 56 is arranged in an adjacent relationship on the opposite side to the third outer diameter portion 54 with respect to the fourth outer diameter portion 55. A fifth outer diameter portion 57 is arranged in an adjacent relationship on the opposite side to the fourth outer diameter portion 55 with respect to the threaded portion 56.

Figure 7:
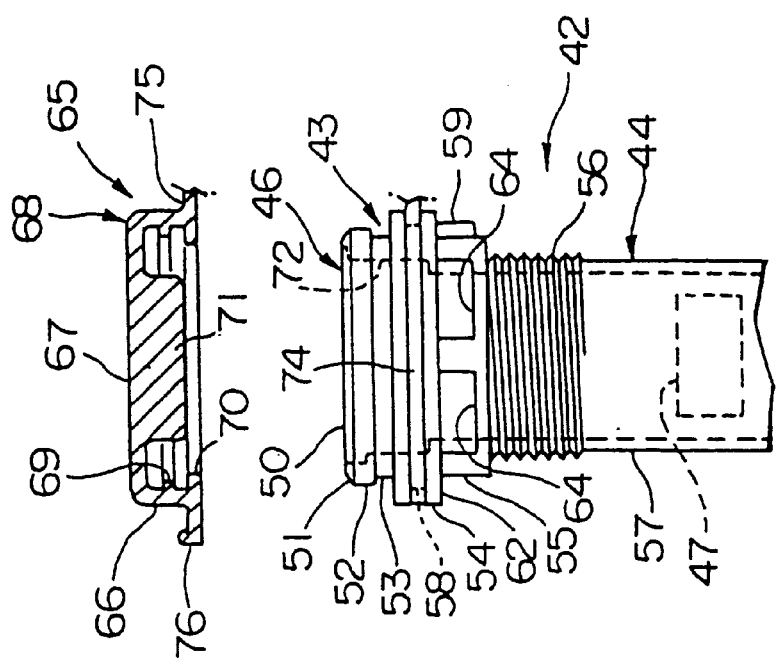
FIG. 7 is a sectional view showing a cap and a socket body of the lamp unit according to the embodiment of the present invention.

It is to be noted that an annular grooved portion 58 is formed at a middle portion of the third outer diameter portion 54 in an axial direction of the same such that it is recessed by one step. A projection 59 which extends outwardly in a radial direction is formed on the fourth outer diameter portion 55, and four arcuately recessed concave portions 64 (only two are shown in FIG. 7) are formed intermittently in a circumferential direction. Here, the projection 59 has a phase determined with respect to a location of a cable 61 which projects from an end face 60 on the bottom side.

In order to mount this socket body 44, the fifth outer diameter portion 57 side of the cylindrical portion 43 is inserted into the mounting hole 39 of the lower cover member 37 from the outside first. Then the projection 59 of the fourth outer diameter portion 55 is engaged with the grooved portion 40 to insert the fourth outer diameter portion 55 into the mounting hole 39. Then, further insertion is stopped when a shoulder 62 between the third outer diameter portion 54 having a diameter larger than the mounting hole 39 and the fourth outer diameter portion 55 contacts the mounting plate portion 38. Further, in this condition, since the projection 59 is engaged with the grooved portion 40, the socket body 44 is prevented from rotation around an axis thereof, and the position thereof in the rotational direction with respect to the lower cover member 37 is defined.

In this condition, the nut member 45 is passed from the inner side of the lower cover member 37 through the fifth outer diameter portion 57. Then the mounting plate portion 38 is held between an end face portion 63 of the nut member 45 and the shoulder 62 of the cylindrical portion 43 of the socket body 44 so that the socket body 44 is mounted on the mounting plate portion 38, that is, the lower cover member 37.

In this mounted condition, the socket body 44 is directed, on the end opening 46 side thereof, obliquely downwardly with respect to the horizontal direction and is directed, at the connection portion 47 provided in the inside thereof, obliquely downwardly in a similar manner.

In the accessory socket 42 described above, a cap 65 is removably provided which covers the cylindrical portion 43 of the socket body 44 on the end opening 46 side to cover the connection portion 47. The cap 65 has a substantially bottomed cylindrical cap body portion 68 having a cylindrical tubular portion 66 and a bottom plate portion 67 provided on one end side of the tubular portion 66. A plurality of annular seal portions 69, 70, preferably two, are formed at two different positions in an axial direction on the inner side of the tubular portion 66 which contact with an outer peripheral face of the cylindrical portion 43 of the socket body 44. The inner diameter of the seal portion 69 on the bottom plate portion 67 side is a little smaller than the outer diameter of the first outer diameter portion 52, and the inner diameter of the seal portion 70 on the opposite side to the bottom plate portion 67 is a little smaller than the outer diameter of the second outer diameter portion 53.

A post-like projection 71 which projects on the same side as the tubular portion 66 is formed at the center of the bottom plate portion 67. The outer diameter of this projection 71 is a little smaller than the diameter of an inner circumferential face 72 of the end opening 46 of the cylindrical portion 43 of the socket body 44.

The cap body portion 68 is mounted on the socket body 44 by inserting the projection 71 into the inner circumferential face 72 side of the cylindrical portion 43 to fit the end opening 46 side of the cylindrical portion 43 of the socket body 44 on the opposite side of the tubular portion 66 to the bottom plate portion 67. In the mounted condition, the seal portion 69 is fitted in the first outer diameter portion 52 with a shrink range to close up a gap from the first outer diameter portion 52, and the seal portion 70 is fitted in the second outer diameter portion 53 with a shrink range to close up a gap from the second outer diameter portion 53.

In addition, the cap 65 has an annular holding portion 74 which is fitted into the grooved portion 58 as the cylindrical portion 43 of the socket body 44 is inserted from the end opening 46 side. A connection portion 75 is provided in the form of a band plate which interconnects the holding portion 74 and the cap body portion 68. An operation portion 76 is formed in a projecting condition on the cap 65 on the opposite side to the connection portion 75 with respect to the cap body portion 68. Here, the holding portion 74 has an inner diameter substantially equal to that of the grooved portion 58 and smaller than that of the third outer diameter portion 54, and consequently, as the holding portion 74 is fitted into the grooved portion 58, it is held by the cylindrical portion 43 of the socket body 44, thereby preventing loss of the cap 65 from the socket body 44.

By applying force to the operation portion 76 in a direction in which the cap body portion 68 is spaced away substantially in an axial direction of the cylindrical portion 43 from a condition-wherein the cap body portion 68 is fitted with the cylindrical portion 43 of the socket body 44, the cap body portion 68 is removed from the socket body 44. The socket body 44 whose cap body portion 68 is removed in this manner exposes the connection portion 47 to the outside, and a connection terminal of an external apparatus or the like is connected to the connection portion 47 so that electric power generated by engine power is supplied to the external apparatus or the like through the connection terminal.

It is to be noted that the holding portion 74, cap body portion 68, connection portion 75 and operation portion 76 are formed as a unitary member from a synthetic resin or the like which can be deformed comparatively readily.

In the assist lamp 11 described above, because the socket body 44 is partly inserted in the cover 33, which covers the lamp body 32, from the front face side of the cover 33 through the mounting hole 39 and mounted by means of the nut member 45 on the rear face of the cover 33, and because the removable cap 65 is provided, water, mud or the like does not directly enter into the inside of the socket body 44. Accordingly, the occurrence of a contact failure or the like at the connection portion 47 can be prevented. Also, a fastening device for mounting the terminal is not exposed to the front face of the cover 33, and the appearance is very good.

In addition, since the socket body 44 is directed obliquely downwardly from a horizontal direction, even if water, mud or the like should enter into the cylindrical portion 43 through the gap between the cap 65 and the socket body 44 and attack the connection portion 47, it likely to flow down and does not stay on the connection portion 47 readily. Accordingly, occurrence of a connection failure or the like at the connection portion 47 can be prevented with certainty.

Furthermore, since the connection portion 47 is embedded in the interior of the inner side of the cylindrical portion 43 and the cap 65 covers the end opening 46 of the cylindrical portion 43 of the socket body 44, even if water, mud or the like should enter through the gap between the cap 65 and the cylindrical portion 43, since there is a long distance from the opening 46 to the connection portion 47, the water, mud or the like can be further prevented from attacking the connection portion 47. Besides, since the cylindrical portion 43 is directed obliquely downwardly on the end opening 46 side thereof, the connection portion 47 is positioned on the upper side than the end opening 46, and even if water, mud or the like should enter through the gap between the cap 65 and the cylindrical portion 43, it can be prevented from attacking the connection portion 47 with a higher degree of certainty. Accordingly, the occurrence of a contact failure or the like at the connection portion 47 can be prevented with a higher degree of certainty.

Also, since a multiple seal structure is employed wherein the two annular seal portions 69, 70 are provided on the cap 65 which contact with the first outer diameter portion 52 and the second outer diameter portion 53 which are outer peripheral portions of the cylindrical portion 43 of the socket body 44, water, mud or the like can be prevented from entering the connection portion 47 side through the gap between the cap 65 and the cylindrical portion 43 of the socket body 44 with a higher degree of certainty. Further, since such sealing is provided for the outer peripheral faces, even if water or the like enters, the influence on the inner circumferential phase of the socket body 44 is little. Consequently, a structure which can be tough against steam washing of the vehicle or immersion in water is obtained. Accordingly, the occurrence of a contact failure or the like at the connection portion 47 can be prevented with a higher degree of certainty.

Further, since the projection 71 to be inserted into the inner circumferential face 72 side of the cylindrical portion 43 of the socket body 44 is provided on the cap 65, as the projection 71 is inserted into the inner circumferential face 72 side of the cylindrical portion 43 upon mounting of the cap 65 onto the cylindrical portion 43, the position of the cap 65 with respect to the cylindrical portion 43 in a diametrical direction is guided, and the mounting feasibility of the cap 65 onto the cylindrical portion 43 can be raised. Since the material thickness can be increased by forming the projection 71, the strength of the cap 65 can be augmented.

In addition, since the accessory socket 42 is mounted on the cover 33 not by means of a screw but by meshing engagement between the socket body 44 and the nut member 45, the structure of the lamp unit can be made compact. Furthermore, since the cable 61 can be arranged in the cover 33, protection of the cable 61 can be facilitated.

As described in detail above, with a lamp unit with an external power supply terminal according to the present invention, since an external power supply terminal body is inserted in a cover which covers a cover body and is mounted by means of a nut on the rear face, and also since a removable cap is provided, water, mud or the like does not directly enter the external power supply terminal. Also, a fastening member for mounting the terminal is not exposed to the front face of the cover, and therefore the appearance is very good.

With a lamp unit with an external power supply terminal of the present invention, since the external power supply terminal directed obliquely downwardly, even if water, mud or the like should enter the external power supply terminal across the cap, it is likely to flow down and is not likely to stay in the external power supply terminal.

With a lamp unit with an external power supply terminal of the present invention, since a multiple seal structure wherein a plurality of seal portions are provided on the cap is employed, water, mud or the like can be prevented from entering the external power supply terminal through a gap between the cap and an opening end of the external power supply terminal with a higher degree of certainty. Further, since such sealing is provided on the outer peripheral face, even if water or the like enters, the influence on an inner peripheral face of the terminal is little.

With a lamp unit with an external power supply terminal of the present invention, since a projection to be inserted into the inner circumferential face side of the opening end of the external power supply terminal is provided on the cap, as the projection is inserted into the inner circumferential face side of the opening end of the external power supply terminal upon mounting of the cap onto the opening end of the external power supply terminal, the position of the cap in a diametrical direction with respect to the opening end of the external power supply terminal is guided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lamp unit comprising:
   a cover including an opening for receiving an external power supply terminal for supplying electric power to the outside;
   a lamp body provided in such a manner as to be partly covered with said cover, said lamp body being provided forwardly of a handle member;
   an external power supply terminal having a terminal body inserted from a front face of said opening and fixedly fastened to said cover by a nut which is meshed with a screw thread portion of said terminal body on a rear face of said opening; and
   a removable cap which is fitted with an end of said external power supply terminal,
   wherein said removable cap includes a connection band attached thereto, said connection band having an annular holding portion attached thereto for engagement with said end of said power supply terminal.

2. The lamp unit according to claim 1, wherein said external power supply terminal is directed obliquely downwardly.

3. The lamp unit according to claim 1, wherein a plurality of annular seal portions which contact with an outer peripheral face of an opening end of said external power supply terminal are provided on said cap.

4. The lamp unit according to claim 1, wherein a projection is provided on said cap for being inserted into an inner peripheral face side of an opening end of said external power supply terminal.

5. A lamp unit for a vehicle comprising:
   an enclosure;
   a connector terminal having a terminal body including a threaded portion;
   said enclosure including an opening therein for receiving said terminal body therethrough;
   a nut threadable with said threaded portion for fastening said connector terminal to said enclosure; and
   a removable cap for covering an end of said connector terminal,
   wherein said removable cap includes a connection band attached thereto, said connection band having an annular holding portion attached thereto for engagement with said end of said connector terminal.

6. The lamp unit according to claim 5, wherein said cap includes a first seal for engaging a first outer diameter portion of said end of said connector terminal.

7. The lamp unit according to claim 6, wherein said removable cap includes a second seal for engaging a second outer diameter portion of said end of said connector terminal.

8. The lamp unit according to claim 7, wherein said end of said connector terminal includes a third outer diameter portion including a groove therein, said annular holding portion being located within said groove.

9. The lamp unit according to claim 8, wherein said enclosure has a sidewall including said opening therein, said sidewall being oriented to face partially downwardly so that when said terminal body is mounted in said opening, said connector terminal faces obliquely downwardly.

10. The lamp unit according to claim 5, wherein said end of said connector terminal includes an annular cylindrical portion including a groove therein, said annular holding portion being located within said groove.

11. The lamp unit according to claim 5, wherein said enclosure has a sidewall including said opening therein, said sidewall being oriented to face partially downwardly so that when said terminal body is mounted in said opening, said connector terminal faces obliquely downwardly.

12. A lamp unit for a vehicle comprising:
   an enclosure including an aperture therein;
   a connector terminal having a terminal body inserted through said aperture;
   a fastener for fastening said connector terminal to said enclosure; and
   a removable cap for covering an end of said connector terminal, said cap including a first seal for engaging a first outer diameter portion of said end of said connector terminal,
   wherein said removable cap includes a connection band attached thereto, said connection band having an annular holding portion attached thereto for engagement with said end of said connector terminal.

13. The lamp unit according to claim 12, wherein said removable cap includes a second seal for engaging a second outer diameter portion of said end of said connector terminal.

14. The lamp unit according to claim 13, wherein said end of said connector terminal includes a third outer diameter portion including a groove therein, said annular holding portion being located within said groove.

15. The lamp unit according to claim 14, wherein said enclosure has a sidewall including said aperture therein, said sidewall being oriented to face partially downwardly so that when said terminal body is mounted in said aperture, said connector terminal faces obliquely downwardly.

16. The lamp unit according to claim 12, wherein said fastener is a threaded nut.

17. The lamp unit according to claim 12, wherein said enclosure has a sidewall including said aperture therein, said sidewall being oriented to face partially downwardly so that when said terminal body is mounted in said aperture, said connector terminal faces obliquely downwardly.

* * * * *